US008653232B2

(12) United States Patent
Konuma

(10) Patent No.: US 8,653,232 B2
(45) Date of Patent: Feb. 18, 2014

(54) MANUFACTURING METHOD OF POLYETHYLENE TEREPHTHALATE

(75) Inventor: Shinya Konuma, Matsuyama (JP)

(73) Assignee: Teijin Fibers Limited, Osaka (JP)

(*) Notice: Subject to any disclaimer, the term of this patent is extended or adjusted under 35 U.S.C. 154(b) by 300 days.

(21) Appl. No.: 12/295,211

(22) PCT Filed: Apr. 5, 2007

(86) PCT No.: PCT/JP2007/058016
§ 371 (c)(1),
(2), (4) Date: Sep. 29, 2008

(87) PCT Pub. No.: WO2007/117028
PCT Pub. Date: Oct. 18, 2007

(65) Prior Publication Data
US 2009/0137769 A1 May 28, 2009

(30) Foreign Application Priority Data

Apr. 6, 2006 (JP) .................................. 2006-105087
Oct. 4, 2006 (JP) .................................. 2006-272854

(51) Int. Cl.
C08G 63/91 (2006.01)
C08F 6/26 (2006.01)

(52) U.S. Cl.
USPC ........................... 528/488; 528/279; 528/287

(58) Field of Classification Search
USPC ..................................... 528/279, 287, 488, 27
See application file for complete search history.

(56) References Cited

U.S. PATENT DOCUMENTS

| 4,205,157 | A | * | 5/1980 | Duh ............................... 528/272 |
| 5,017,680 | A | | 5/1991 | Sublett | |
| 2004/0176564 | A1 | | 9/2004 | Yamamoto et al. | |

FOREIGN PATENT DOCUMENTS

| EP | 1584712 A1 | 10/2005 |
| EP | 1595984 A1 | 11/2005 |
| JP | 48-101462 A | 12/1973 |
| JP | 51-48505 A | 4/1976 |
| JP | 55-089331 | 7/1980 |
| JP | 58-38722 A | 3/1983 |
| JP | 03-047830 | 2/1991 |
| JP | 07-138354 A | 5/1995 |
| JP | 2001-524536 A | 12/2001 |
| JP | 2002-167495 A | 6/2002 |
| JP | 2003-160655 A | 6/2003 |
| JP | 2003-160656 A | 6/2003 |
| JP | 2003-183485 A | 7/2003 |
| JP | 2004-10657 A | 1/2004 |
| JP | 2004-60063 A | 2/2004 |
| TW | I227246 B | 2/2005 |
| WO | 99/28033 A1 | 6/1999 |
| WO | 03/008479 A1 | 1/2003 |
| WO | 2005/023900 A1 | 3/2005 |

OTHER PUBLICATIONS

Singapore Search Report and Written Opinion corresponding to Singapore Patent Application and Written Opinion No. 200807074-0 dated Mar. 10, 2010.
Taiwanese Office Action, dated Nov. 28, 2012, issued in corresponding Taiwanese Patent Application No. 096112117.
Indian Office Action for Application No. 7692/DELNP/2008 dated Oct. 3, 2013; 2 pages.

* cited by examiner

Primary Examiner — Ling Choi
Assistant Examiner — Gennadiy Mesh
(74) Attorney, Agent, or Firm — Sughrue Mion, PLLC

(57) ABSTRACT

A manufacturing method of polyethylene terephthalate including a step of melt polycondensation in presence of polycondensation catalyst represented by general Formula (I), wherein $R_1$ represents an alkyl group having from 2 to 12 carbon atoms, and melt polycondensed polyethylene terephthalate has an intrinsic viscosity of from 0.48 to 0.53 dL/g and a terminal carboxyl number of from 14 to 22 mmol/kg; and a step of solid phase polycondensation to obtain solid phase polycondensed polyethylene terephthalate having an intrinsic viscosity of from 0.70 to 0.86 dL/g, and a terminal carboxyl number of less than 15 mmol/kg, followed by a step of applying an aqueous solution of at least one salt selected from the group consisting of acetate, carbonate, and sulfate of sodium, potassium, or cesium to the solid phase polycondensed polyethylene terephthalate, and then drying the polyethylene terephthalate, wherein the final content of sodium, potassium or cesium atom in dried polyethylene terephthalate is from 2 to 25 ppm.

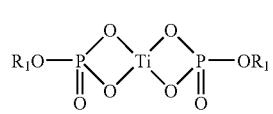

(I)

13 Claims, No Drawings

MANUFACTURING METHOD OF POLYETHYLENE TEREPHTHALATE

CROSS REFERENCE TO RELATED APPLICATIONS

This application is a 371 of PCT/JP2007/058016 filed Apr. 5, 2007, which claims priority from Japanese Patent Application No. 2006-105087 filed Apr. 6, 2006 and Japanese Patent Application No. 2006-272854 filed Oct. 4, 2006.

TECHNICAL FIELD

The present invention relates to a manufacturing method of polyethylene terephthalate from which a molded article with low acetaldehyde content and cyclic trimer content can be obtained without being accompanied with deterioration of a hue. Acetaldehyde may possibly become a cause for an offensive smell or a stench or may possibly degenerate a flavor of the contents and in using a polyethylene terephthalate molded article, may possibly bring adverse influences.

BACKGROUND ART

Polyethylene terephthalate is widely used upon being molded into a fiber, a film, a sheet, a bottle, a cup or a tray because of its excellent mechanical properties and chemical properties.

Such polyethylene terephthalate can be usually manufactured by using, as starting materials, an aromatic dicarboxylic acid such as terephthalic acid and an aliphatic diol such as ethylene glycol. Concretely, polyethylene terephthalate is manufactured by first subjecting an aromatic dicarboxylic acid and an aliphatic diol to an esterification reaction to form a low-order condensate (ester low polymer) and then subjecting this low-order condensate to a de-glycolation reaction (melt polycondensation) in the presence of a polycondensation catalyst. Also, if desired, after the melt polycondensation, solid phase polycondensation is further carried out, thereby more increasing the molecular weight.

In the manufacturing method of polyethylene terephthalate, an antimony compound or a germanium compound has hitherto been used as a polycondensation catalyst. However, polyethylene terephthalate manufactured by using an antimony compound as a polycondensation catalyst was inferior to polyethylene terephthalate manufactured by using a germanium compound as a polycondensation catalyst with respect to transparency and heat resistance. Also, in particular, for drink bottle applications and packaging materials for foodstuffs, it is also demanded to reduce the acetaldehyde content in the resulting polyethylene terephthalate. Furthermore, there is a thought that the antimony compound has fear in hygiene.

On the other hand, not only the germanium compound is free from fear in hygiene, but also a polyethylene terephthalate molded article manufactured by using a germanium compound as a polycondensation catalyst has good transparency and low acetaldehyde content and oligomer content. But, since the germanium compound is expensive, there was involved a problem that the manufacturing cost of polyethylene terephthalate becomes high.

Furthermore, in recent years, an aluminum compound is proposed as a polycondensation catalyst of polyethylene terephthalate. But, an organoaluminum compound is not comparable to the germanium compound but is still relatively expensive; and it is known that a part of water-soluble aluminum salts are neurotoxic so that fear in hygiene remains, too.

Now, it is also known that a titanium compound has an action to promote a polycondensation reaction of ester; and titanium alkoxides, titanium tetrachloride, titanyl oxalate, orthotitanic acid, and the like are known as a polycondensation catalyst. Moreover, since the titanium compound is not problematic in hygiene and is cheap, a number of investigations for utilizing the titanium compound as a polycondensation catalyst are made.

However, in the case where the titanium compound is used as a polycondensation catalyst, there was involved a problem that the acetaldehyde content or oligomer content in a polyethylene terephthalate chip and its molded article is high as compared with polyethylene terephthalate obtained by using a germanium compound as a polycondensation catalyst. A major component of the subject oligomer is a cyclic trimer of ethylene terephthalate and is hereinafter often referred to as "Cy-3".

There is a problem that an oligomer present in a polyethylene terephthalate chip or an oligomer formed during polyethylene terephthalate molding adheres as a white powder to rollers of stretching equipment or rollers of heating equipment and stains it; or a problem that an oligomer becomes a foreign matter in a powdered state and stains a dyeing liquid at the time of dyeing working. Also, likewise at the time of fiber manufacture, at the time of film fabrication, there is involved a problem that an oligomer stains rollers of equipment of every kind; or a problem that an oligomer causes a product defect such as so-called dropout in a magnetic tape. Furthermore, at the time of molding of various other molded articles such as a hollow container, an oligomer becomes a white powder to stain a molding die or adhere to a surface of the molded article, whereby a molded article with a normal appearance is not obtainable. In addition, there was a problem that an oligomer generated at the time of stretching processing or heating processing adheres to a die or the like, whereby transparency of a molded article is more remarkably hindered due to transfer.

In order to solve these problems, a method of reducing the oligomer content in polyethylene terephthalate is studied, and a number of proposals have been made. For example, Patent Document 1 and Patent Document 2 propose a method of reducing the oligomer content by a solid phase polycondensation method of heating polyethylene terephthalate in a high vacuum state at not higher than its melting point. Also, Patent Document 3 proposes a method of reducing the oligomer content by a solid phase polycondensation method of heating polyethylene terephthalate in an inert gas atmosphere at a temperature of not higher than the melting point.

In the case of reducing the oligomer content by this method, there is brought an effect for reducing the amount of generation of a white powder with respect to polyethylene terephthalate having a relatively high oligomer content in polyethylene terephthalate. But, with respect to polyethylene terephthalate having a relatively low oligomer content in polyethylene terephthalate, not only the effect for reducing the amount of generation of a white powder cannot be exhibited, but also the amount of generation of a white powder may possibly increase conversely.

Also, in the case where polyethylene terephthalate is used as a packaging resin for foodstuffs, especially drinks, since acetaldehyde contained in polyethylene terephthalate may possibly influence flavor properties of a drink, it is also simultaneously demanded to reduce the acetaldehyde content in polyethylene terephthalate. Patent Document 4 describes that the amount of acetaldehyde and the amount of an oligomer formed at the time of molding by treating polyethylene terephthalate after the solid phase polycondensation with water can be reduced. But, in the case where the polycondensation catalyst is not a germanium compound but an antimony compound, an aluminum compound or a titanium compound, the effect is not exhibited at all.

Incidentally, as a method of reducing the acetaldehyde content or the oligomer content in a polyethylene terephthalate molded article, Patent Document 6 and Patent Document 7 propose a method of adding an alkali metal salt or an alkaline earth metal salt. But, only by this method, the acetaldehyde content in a polyethylene terephthalate molded article is considerably higher than that in polyethylene terephthalate resulting from using a germanium compound as the catalyst.

Also, Patent Document 8 reports a method in which by using a compound obtained by reacting a titanium compound and a monoalkyl phosphate as a polycondensation catalyst, polyethylene terephthalate having a lower acetaldehyde content in a molded article than that at the time of using a conventional titanium catalyst is obtainable. But, even in this method, the acetaldehyde content in a molded article is higher than that in polyethylene terephthalate resulting from using a germanium as the catalyst.

(Patent Document 1) JP-A-48-101462
(Patent Document 2) JP-A-51-048505
(Patent Document 3) JP-A-55-189331
(Patent Document 4) JP-A-3-47830
(Patent Document 5) U.S. Pat. No. 5,017,680
(Patent Document 6) WO 05/023900
(Patent Document 7) JP-A-2004-010657
(Patent Document 8) WO 03/008479

DISCLOSURE OF THE INVENTION

Problems that the Invention is to Solve

An object of the invention is to overcome the foregoing problems accompanying in the conventional technologies and to provide a manufacturing method of polyethylene terephthalate which is suitable for obtaining a molded article with a low acetaldehyde content.

Means for Solving the Problems

A problem of the invention is to provide polyethylene terephthalate, a molded article of which has low acetaldehyde content and oligomer content and has a good hue.

In order to solve the foregoing problem, the present inventors made extensive and intensive investigations. As a result, on review of a condition of melt polycondensation in detail by using a specified compound containing a titanium atom and a phosphorus atom, it has been found that the problem can be solved by obtaining polyethylene terephthalate whose carboxyl terminal number and intrinsic viscosity are strictly controlled and solid phase polycondensing it, leading to accomplishment of the invention.

That is, the problem of the invention is concerned with a manufacturing method of polyethylene terephthalate and can be solved by a manufacturing method of polyethylene terephthalate including a step of carrying out melt polycondensation by using a compound represented by the following general formula (I) as a polycondensation catalyst to obtain melt polycondensed polyethylene terephthalate having an intrinsic viscosity of from 0.48 to 0.53 dL/g and a terminal carboxyl number of from 14 to 22 mmol/kg; and a step of further solid phase polycondensing the melt polycondensed polyethylene terephthalate to obtain solid phase polycondensed polyethylene terephthalate having an intrinsic viscosity of from 0.70 to 0.86 dL/g.

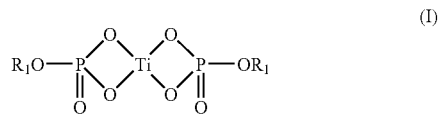

[In the foregoing general formula (I), $R_1$ represents an alkyl group having from 2 to 12 carbon atoms.]

Furthermore, it is preferable that in any step of the polyethylene terephthalate manufacturing process, a metal salt containing at least one atom selected from the group consisting of sodium, potassium and cesium is added.

Advantages of the Invention

The invention is concerned with a method for manufacturing polyethylene terephthalate under a specified condition by using, as a polycondensation catalyst, a titanium compound which is cheaper than a germanium compound and which is less feared in hygiene as compared with an antimony compound or an aluminum compound. According to the subject manufacturing method, it is possible to obtain polyethylene terephthalate capable of manufacturing a molded article having low acetaldehyde content and low oligomer content comparable to polyethylene terephthalate resulting from using a germanium compound as a polycondensation catalyst.

BEST MODES FOR CARRYING OUT THE INVENTION

The invention is hereunder described in detail. The polyethylene terephthalate in the manufacturing method of the invention is polyethylene terephthalate in which a major repeating unit thereof is an ethylene terephthalate unit. The term "major" as referred to herein means that the unit accounts for 80% by mole or more and not more than 100% by mole in the repeating units constituting the polyethylene terephthalate. Accordingly, in the polyethylene terephthalate of the invention, the remainder of from 0 to 20% by mole may be copolymerized with other copolymerization components than the ethylene terephthalate component. Examples of other copolymerization components as referred to herein include unsubstituted or substituted isophthalic acid, naphthalene dicarboxylic acid, diphenyldicarboxylic acid, diphenyl ether dicarboxylic acid, diphenylsulfonedicarboxylic acid, diphenoxyethanedicarboxylic acid, succinic acid, adipic acid, sebacic acid, azelaic acid, decanedicarboxylic acid, cyclohexanedicarboxylic acid, trimellitic acid, pyromellitic acid, or lower alkyl esters thereof, lower aryl esters thereof or ester forming derivatives of acid halides thereof, trimethylene glycol, 1,2-propanediol, tetramethylene glycol, neopentyl glycol, hexamethylene glycol, decanemethylene glycol, dodecamethylene glycol, 1,4-cyclohexanedimethanol, diethylene glycol, triethylene glycol, tetraethylene glycol, polyethylene glycol, dipropylene glycol, tripropylene glycol, tetrapropylene glycol, polypropylene glycol, di(tetramethylene) glycol, tri(tetramethylene) glycol, polytetramethylene glycol, pentaerythritol, and 2,2-bis(4-β-hydroxyethoxyphenyl)propane.

In the invention, it is necessary to use a compound represented by the following formula (I) as a polycondensation catalyst. Furthermore, it is preferred to use the polycondensation catalyst in an amount of from 1 to 50 ppm based on the polyethylene terephthalate obtained by the solid phase polycondensation in terms of a titanium atom concentration. The compound which becomes the polycondensation catalyst can be, for example, manufactured by heating a titanium compound and a phosphorus compound in a glycol as a solvent. In that case, the compound which becomes the subject polycondensation catalyst is obtained as a deposit in the glycol.

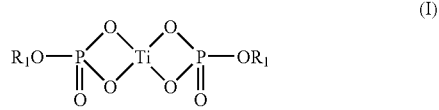

[In the foregoing general formula (I), $R_1$ represents an alkyl group having from 2 to 12 carbon atoms.]

The two $R_1$ groups in the general formula (I) are each independently an alkyl group derived from the titanium compound or an alkyl group derived from the phosphorus compound, and preferably an alkyl group having from 3 to 6 carbon atoms.

Examples of the titanium compound which is used for manufacturing the polycondensation catalyst include titanium tetrabutoxide, titanium tetraisopropoxide, titanium tetra-n-propoxide, titanium tetraethoxide, titanium tetramethoxide, a tetrakis(acetylacetonato)titanium complex, a tetrakis(2,4-hexanedionato)titanium complex, a tetrakis(3,5-heptanedionato)titanium complex, a dimethoxybis(acetylacetonato)titanium complex, a diethoxybis(acetylacetonato)titanium complex, a diisopropoxybis(acetylacetonato) titanium complex, a di-n-propoxybis(acetylacetonato) titanium complex, a dibutoxybis(acetylacetonato)titanium complex, titanium dihydroxybisglycolate, titanium dihydroxybisglycolate, titanium dihydroxybislactate, titanium dihydroxybis(2-hydroxypropionate), titanium lactate, titanium octanediolate, titanium dimethoxybistriethanol aminate, titanium diethoxybistriethanol aminate, titanium dibutoxybistriethanol aminate, hexamethyl dititanate, hexaethyl dititanate, hexapropyl dititanate, hexabutyl dititanate, hexaphenyl dititanate, octamethyl trititanate, octaethyl trititanate, octapropyl trititanate, octabutyl trititanate, octaphenyl trititanate, a hexaalkoxy dititanate, and an octaalkyl trititanate.

Also, as the phosphorus compound, monoalkyl phosphates such as monoethyl phosphate, monopropyl phosphate, monobutyl phosphate, monohexyl phosphate, monooctyl phosphate, monodecyl phosphate, monolauryl phosphate, monooleyl phosphate, and monotetradecyl phosphate, and monophenyl phosphate are preferable. Such a phosphorus compound may also be used as a mixture, and for example, a combination made of a mixture of a monoalkyl phosphate and monophenyl phosphate can be preferably enumerated. Above all, it is especially preferable that the mixture is constituted such that a ratio of the monoalkyl phosphate is 90% by mole or more and not more than 100% by mole.

Also, examples of the glycol which is used as the solvent in manufacturing the polycondensation catalyst of the general formula (I) include ethylene glycol, propylene glycol, tetramethylene glycol, hexamethylene glycol, and cyclohexanedimethanol. It is preferable that the glycol which is used in manufacturing the polycondensation catalyst is a glycol the same as the glycol which is used as a starting material of polyethylene terephthalate to be manufactured by using the subject polycondensation catalyst.

The polycondensation catalyst which is used in the invention can be manufactured by a method in which three of a titanium compound, a phosphorus compound and a glycol are simultaneously mixed and heated, or a method in which a solution of a glycol of each of a titanium compound and a phosphorus compound is prepared and these glycol solutions are mixed and heated. Of these, the latter method is preferable.

When the reaction temperature in manufacturing the polycondensation catalyst is the normal temperature, the reaction may not possibly proceed sufficiently, or the reaction may possibly require an excessively long time. Accordingly, it is preferable that the reaction is usually carried out at a temperature of from 50° C. to 200° C., and it is preferable that the reaction is accomplished for a reaction time of from one minute to 4 hours. Concretely, when ethylene glycol is used as the glycol, the reaction temperature is preferably from 50° C. to 150° C., and when hexamethylene glycol is used, the reaction temperature is preferably from 100° C. to 200° C. Also, when such a glycol is used, the reaction time is more preferably in the range of from 30 minutes to 2 hours. When the reaction temperature is too high, or when the reaction time is too long, deterioration of the manufactured polycondensation catalyst occurs, and therefore, such is not preferable.

Also, in manufacturing the polycondensation catalyst upon reaction of the titanium compound and the phosphorus compound, a molar ratio of a phosphorus atom to a titanium atom (phosphorus atom molar amount/titanium atom molar amount) is preferably 1.5 or more and less than 2.5, and more preferably 1.7 or more and less than 2.3. When the molar ratio is less than 1.5, physical properties of polyethylene terephthalate may possibly be deteriorated due to the matter that a large amount of an unreacted titanium compound is present. Conversely, when the molar ratio is 2.5 or more, a polymerization rate of polyethylene terephthalate may possibly become slow, or physical properties of polyethylene terephthalate may possibly be deteriorated due to the matter that a large amount of an unreacted phosphorus compound is present.

A liquid containing, as a deposit, the polycondensation catalyst obtained by such an operation which is used in the invention may be used as a catalyst for manufacturing polyethylene terephthalate as it stands without being subjected to solid-liquid separation. On the other hand, after separating the deposit and the solvent by centrifugation or filtration, the thus separated deposit may be purified and used as the polycondensation catalyst. As a specific purification method, there can be enumerated a method of carrying out recrystallization by using acetone, methyl alcohol or a mixed solvent of methyl alcohol and water.

Since the foregoing polycondensation catalyst which is used in the invention can be easily separated from the glycol by using a filter, a chemical structure thereof and a titanium atom content in the subject polycondensation catalyst can be analyzed by solid NMR and XMA metal quantitative analysis after the separation. On the other hand, since the unreacted titanium compound and the phosphorus compound are soluble in the glycol, a rate of unreaction can be determined by analyzing a titanium atom concentration or a phosphorus atom concentration in the filtrate component.

In manufacturing polyethylene terephthalate using the foregoing polycondensation catalyst, it is preferred to use the polycondensation catalyst in an amount of from 1 to 50 ppm based on the polyethylene terephthalate obtained by the solid phase polycondensation in terms of a titanium atom concentration. Furthermore, the polycondensation catalyst is preferably used in an amount of from 5 to 25 ppm, and more preferably from 6 to 20 ppm in terms of a titanium atom concentration in the finally obtained solid phase polycondensed polyethylene terephthalate. In carrying out an operation for adding a compound containing at least one atom of sodium, potassium and cesium as described later, it is especially preferred to use the polycondensation catalyst in an amount ranging from 5 to 25 ppm. When the polycondensation catalyst is used such that it is contained in an amount of 50 ppm or more, a polymerization rate of liquid phase polycondensation or solid phase polycondensation may possibly become too fast, or the polyethylene terephthalate may possibly become colored strongly. On the other hand, when the polycondensation catalyst is used in an amount of less than 1 ppm, a polymerization rate of liquid phase polycondensation or solid phase polycondensation may possibly become too slow, or the polycondensation reaction does not proceed at all. Then, with respect to metal atoms in the resulting polyethylene terephthalate, a concentration of metal atoms other than the titanium atom is preferably not more than 10 ppm, and more preferably not more than 5 ppm. Incidentally, it would be better that the foregoing polycondensation catalyst is present at the time of polycondensation reaction. For that reason, the addition of the polycondensation catalyst may be carried out in any step of the melt polycondensation, namely a starting slurry preparation step, an esterification reaction step, a liquid phase polycondensation step, or other steps. Also, the whole of the polycondensation catalyst may be added in a reactor all together, or the polycondensation catalyst may be dividedly added in a reactor. The manufacturing method of polyethylene terephthalate of the invention is hereunder described in more detail for every step.

(Starting Materials)

Furthermore, the manufacturing method of polyethylene terephthalate in the invention is described in detail. The polyethylene terephthalate can be manufactured by polycondensing mainly terephthalic acid or its ester-forming derivative and ethylene glycol by using the foregoing polycondensation catalyst.

As an aromatic dicarboxylic acid component, terephthalic acid is mainly used, and besides, its ester-forming derivative can be used. The "ester-forming derivative" as referred to herein means a lower alkyl ester, a lower aryl ester, or an acid halide. Incidentally, it is desirable that the terephthalic acid or its ester-forming derivative is used in an amount of 80% by mole or more and not more than 100% by mole, and preferably 90% by mole or more and not more than 100% by mole based on 100% by mole of the aromatic dicarboxylic acid component. It is desirable that the ethylene glycol is used in an amount of 80% by mole or more and not more than 100% by mole, and preferably 90% by mole or more and not more than 100% by mole based on 100% by mole of the aliphatic glycol component. An example of manufacturing polyethylene terephthalate by using terephthalic acid and ethylene glycol is hereunder described in detail.

(Starting Slurry Preparation Step)

First of all, in manufacturing polyethylene terephthalate, terephthalic acid and ethylene glycol are esterified. Concretely, a slurry containing terephthalic acid and ethylene glycol is prepared. This slurry preferably contains ethylene glycol in an amount of from 1.2 to 1.8 moles, and more preferably from 1.3 to 1.6 moles per mole of the terephthalic acid. This slurry is continuously fed into an esterification reaction step. For the subject ethylene glycol, a part of ethylene glycol which has been distilled off from a reactor and recovered in an esterification reaction step or a liquid phase polycondensation step as described later may be used.

(Esterification Reaction Step)

As the esterification reaction step, a method in which an esterification reaction is carried out at one stage while self-circulating the reaction product within an esterification reactor, or a method in which two or more esterification reactors are connected to each other in series and an esterification reaction is similarly carried out while self-circulating the reaction product is preferable. In all of these methods, the esterification reaction is carried out under a condition under which ethylene glycol is refluxed while removing water formed by the esterification reaction outside the esterification reactor or reactors by a rectifying column. With respect to the reaction condition under which the esterification is continuously carried out at one stage while self-circulating the reaction product, in general, it is preferable that the reaction is carried out under a condition that a reaction temperature is from 240 to 280° C. and that a reaction pressure is from atmospheric pressure to 0.3 MPa. Though the reaction temperature of the esterification step may be first carried out in a low-temperature region within this range, the final esterification reaction temperature is regulated preferably at from 250 to 279° C., more preferably from 265 to 276° C., and most preferably from 273 to 275° C. The "final esterification reaction temperature" as referred to herein means a reaction temperature at a point of time of completion of the esterification reaction step.

In this esterification reaction step, ethylene glycol and terephthalic acid are used such that a molar ratio of ethylene glycol to terephthalic acid is from 1.2 to 1.8, and preferably from 1.3 to 1.6. When the manufacture is carried out in a continuous system, it is preferable that as described previously, a slurry containing ethylene glycol and terephthalic acid is prepared in advance and that the molar ratio in the subject slurry is adjusted so as to fall within the foregoing range. When the manufacture is carried out in a batch system, it is preferable that the molar ratio is regulated so as to fall within the foregoing range inclusive of ethylene glycol or terephthalic acid to be added on the way of the esterification reaction in addition to ethylene glycol and terephthalic acid present in the reactor at the beginning of starting the esterification reaction. By carrying out the esterification reaction within this molar ratio range, it becomes easy to control an intrinsic viscosity value or a terminal carboxyl number value of melt polycondensed polyethylene terephthalate as described later within a prescribed range.

In this esterification reaction step, it is desired to carry out the reaction such that a rate of esterification reaction is usually 90% or more, preferably 90% or more and not more than 100%, more preferably 95% or more and not more than 100%, and further preferably 97% or more and not more than 100%. By adjusting the reaction temperature and reflux ratio of ethylene glycol at the time of this esterification reaction, it is possible to control the terminal carboxyl number of the polyethylene terephthalate obtained by the melt polycondensation reaction. Also, when these condition ranges are deviated, the intrinsic viscosity may not possibly increase in the later liquid phase polycondensation step.

By this esterification reaction step, an esterification reaction product (ethylene terephthalate oligomer) of terephthalic acid and ethylene glycol is obtained. A polymerization degree of this ethylene terephthalate oligomer is preferably from 3 to 12, more preferably from 4 to 10, and most preferably from 6 to 10. The ethylene terephthalate oligomer obtained in the foregoing esterification reaction step is subsequently fed into a polycondensation (liquid phase polycondensation) step. The polymerization degree of the ethylene terephthalate oligomer can be controlled by properly adjusting the foregoing ethylene glycol/terephthalic acid molar ratio, esterification reaction time, reaction pressure and reaction time, thereby adjusting the rate of esterification reaction. When the polymerization degree range of this ethylene terephthalate oligomer is deviated, the intrinsic viscosity may not possibly increase in the later liquid phase polycondensation step.

(Liquid Phase Polycondensation Step)

Next, in the liquid phase polycondensation step, the ethylene terephthalate oligomer obtained in the esterification reaction step is polycondensed in the presence of the foregoing polycondensation catalyst upon heating at a temperature of a melting point of polyethylene terephthalate or higher and not higher than a decomposition temperature of polyethylene terephthalate (usually from 240 to 280° C.) under a reduced pressure. It is desirable that this polycondensation reaction is carried out while distilling off unreacted ethylene glycol and ethylene glycol generated by the polycondensation outside a reactor.

The liquid phase polycondensation step may be carried out in a single tank or may be carried out dividedly in plural tanks. For example, when the liquid phase polycondensation step is carried out at two stages, the polycondensation reaction in a first tank is carried out under a condition that the reaction temperature is from 245 to 290° C., and preferably from 260 to 280° C. and that the reaction pressure is from 100 to 1 kPa, and preferably from 50 to 2 kPa. The polycondensation reaction in a final second tank is carried out under a condition that the reaction temperature is from 265 to 300° C., and preferably from 270 to 290° C. and that the reaction pressure is usually from 1,000 to 10 Pa, and preferably from 500 to 30 Pa. By properly adjusting the polycondensation reaction temperature, polycondensation reaction pressure and polycondensation reaction time, the intrinsic viscosity of the resulting melt polycondensed polyethylene terephthalate is controlled so as to fall within the following range. Incidentally, the reaction time of the polycondensation step is preferably not more than 240 minutes, and more preferably not more than 200 minutes in terms of a residence time within the polycondensation reaction tank. Polyethylene terephthalate can be thus manufactured by using the foregoing polycondensation catalyst.

The polyethylene terephthalate obtained in this polycondensation step is usually cooled while extruding in a molten state and then cut to obtain granular (chipped) polyethylene terephthalate. It is necessary that the resulting polyethylene terephthalate has an intrinsic viscosity IV corresponding to the range of from 0.48 to 0.53 dL/g and a terminal carboxyl number corresponding to the range of from 14 to 22 mmol/kg. Preferably, the polyethylene terephthalate has an intrinsic viscosity corresponding to the range of from 0.48 to 0.52 dL/g and a terminal carboxyl number corresponding to the range of from 17 to 22 mmol/kg. When the intrinsic viscosity is less than a lower limit of this range, there is caused a problem that deformation or powdering of a chip occurs at the time of conveyance of the polyethylene terephthalate chip or in the solid phase polycondensation step, or a problem that the time of the solid phase polycondensation reaction becomes long, resulting in a reduction in the productivity. For that reason, it is preferable that the intrinsic viscosity of polyethylene terephthalate is high as far as possible. But, when the intrinsic viscosity exceeds an upper limit of the foregoing range, there is caused a problem that the acetaldehyde and tricyclic trimer amounts in the polyethylene terephthalate after the solid phase polymerization and the polyethylene terephthalate molded article are high. Also, when the terminal carboxyl number is less than a lower limit of the foregoing range, the acetaldehyde content in the polyethylene terephthalate molded article is high; and when the terminal carboxyl number exceeds an upper limit of the foregoing range, the cyclic trimer content is high.

Also, in the polycondensation reaction, a phosphorus stabilizer such as trimethyl phosphate may be added at an arbitrary stage in the polyethylene terephthalate manufacture as the need arises. Furthermore, an antioxidant, an ultraviolet light absorber, a flame retarder, a fluorescent brightener, a matting agent, an orthochromatic agent, a defoaming agent, other additives, or the like may be blended in polyethylene terephthalate. Moreover, for the purpose of improving and assisting a hue of the resulting polyethylene terephthalate, an organic blue pigment such as azo compounds, triphenylmethane compounds, quinoline compounds, anthraquinone compounds, and phthalocyanine compounds, an inorganic blue dye, or other orthochromatic agent can also be added in a reactor at the manufacturing stage of polyethylene terephthalate.

(Solid Phase Polycondensation Step)

In the invention, it is necessary that the polyethylene terephthalate obtained in the foregoing liquid phase polycondensation step is further provided for solid phase polycondensation. The granular polyethylene terephthalate to be fed into the solid phase polycondensation step may be fed into the solid phase polycondensation step after preliminary crystallization upon heating in advance at a temperature lower than the temperature in the case where the solid phase polycondensation is carried out.

This preliminary crystallization step can be carried out by heating the granular polyethylene terephthalate in a dried state at a temperature of usually from 120 to 200° C., and preferably from 130 to 180° C. for from one minute to 4 hours. Also, such preliminary crystallization can also be carried out by heating the granular polyethylene terephthalate at a temperature of from 120 to 200° C. for one minute or more in a steam atmosphere, a steam-containing inert gas atmosphere, an inert gas atmosphere or a steam-containing air atmosphere or under circulation of such a gas. The heating time is preferably one minute or more and not more than 20 hours, more preferably 30 minutes or more and not more than 10 hours, and most preferably one hour or more and not more than 8 hours.

It is preferable that the preliminarily crystallized polyethylene terephthalate has a degree of crystallization of from 20 to 50%. Incidentally, a so-called solid phase polycondensation reaction of polyethylene terephthalate does not proceed by this preliminary crystallization, and the intrinsic viscosity of the preliminarily crystallized polyethylene terephthalate is substantially the same as the intrinsic viscosity of polyethylene terephthalate after the liquid phase polycondensation. A difference between the intrinsic viscosity of the preliminarily crystallized polyethylene terephthalate and the intrinsic viscosity of the polyethylene terephthalate before the preliminary crystallization is usually not more than 0.06 dL/g. With respect to the degree of crystallization of polyethylene terephthalate, since it is recognized that a density in a completely crystalline state and a density in a completely amorphous state are 1.501 g/cm$^3$ and 1.335 g/cm$^3$, respectively, the degree of crystallization can be calculated by measuring a specific gravity of the resulting polyethylene terephthalate sample by a density gradient tube, etc.

The solid phase polycondensation step is composed of at least one stage, and the reaction temperature is from 190 to 230° C., preferably from 195 to 225° C., and more preferably from 200 to 225° C. It is desirable that the solid phase polycondensation step is carried out in an inert gas atmosphere of nitrogen, argon or carbon dioxide gas or others under a condition that a reaction pressure is from 200 kPa to 1 kPa, preferably from atmospheric pressure to 10 kPa because oxidation decomposition can be suppressed. A cheap nitrogen gas is desirable as the inert gas to be used.

The granular polyethylene terephthalate obtained via such a solid phase polycondensation step may be subjected to a water treatment as the need arises. This water treatment is carried out by bringing the granular polyethylene terephthalate into contact with water, steam, a steam-containing inert gas or steam-containing air.

It is necessary that an intrinsic viscosity IV of the thus obtained granular polyethylene terephthalate is from 0.70 to 0.86 dL/g. Furthermore, it is preferable that the polyethylene terephthalate after the solid phase polycondensation has a terminal carboxyl number of less than 15 mmol/kg. The terminal carboxyl number is more preferably 0 or more and less than 15 mmol/kg, and further preferably from 5 to 12 mmol/kg. The manufacturing process of polyethylene terephthalate including the foregoing esterification reaction step, liquid phase polycondensation step and solid phase polycondensation step can be carried out in any of a batch system, a semi-continuous system or a continuous system. What the intrinsic viscosity of the polyethylene terephthalate after the solid phase polycondensation is less than 0.70 dL/g is not preferable because the strength of a polyethylene terephthalate molded article obtained by melt molding of polyethylene terephthalate may possibly become insufficient, or whitening of the appearance may possibly occur in applications requiring transparency as in a bottle or the like. On the other hand, what the intrinsic viscosity exceeds 0.86 dL/g is not preferable because a polyethylene terephthalate molded article may possibly lose toughness and become brittle, or a crystallization rate may possibly become slow. Also, what the terminal carboxyl number of the polyethylene terephthalate after the solid phase polycondensation is 15 mmol/kg or more is not preferable because the cyclic trimer content may possibly increase. In order to regulate the terminal carboxyl number of the polyethylene terephthalate after the solid phase polycondensation at less than 15 mmol/kg, it is important that melt polycondensed polyethylene terephthalate having the foregoing intrinsic viscosity and terminal carboxyl number is obtained in the liquid phase polycondensation step and that the solid phase polycondensation step is carried out in an inert gas atmosphere at a temperature of the foregoing range under a pressure of the foregoing range.

Incidentally, in the technologies of the present application, it is preferred to add a compound containing at least one atom of sodium, potassium and cesium in polyethylene terephthalate until it is molded in a concentration of from 2 to 25 ppm in terms of such a metal atom in the polyethylene terephthalate. Metal salts other than sodium, potassium or cesium do not substantially have an effect for reducing the acetaldehyde content. Even if a sodium salt, a potassium salt or a cesium salt is used, when the concentration of such a metal atom in the polyethylene terephthalate is less than 2 ppm, an effect for reducing the acetaldehyde content is not substantially brought; and when such a metal salt is added in an amount exceeding 25 ppm, molding abnormality such as the generation of a foreign matter in the polyethylene terephthalate molded article occurs. In the usual polyethylene terephthalate manufacturing process, since the amount of the metal salt charged at the time of addition is contained in the polyethylene terephthalate as it stands, by taking into consideration this point, the amount of addition at the time of manufacture can be calculated such that from 2 to 25 ppm of the metal atom is contained in the resulting polyethylene terephthalate. In order to contain the foregoing at least one atom of sodium, potassium and cesium in the polyethylene terephthalate, it is preferred to add at least one metal salt selected from the group consisting of acetates, carbonates and sulfates. Of these, acetates are preferable, namely it is preferred to use sodium acetate, potassium acetate or cesium acetate.

As a concrete addition method of such a sodium, potassium or cesium metal salt, though the metal salt can be added in any arbitrary step of the polyethylene terephthalate manufacturing process, when the metal salt is added at the liquid phase polycondensation stage, deterioration of the hue of polyethylene terephthalate or a reduction in the polycondensation reaction may possibly be generated, and such is not preferable. Also, when the metal salt is added directly in a powdered form at the time of melt molding, not only the adhesive amount may possibly become non-uniform, but also the operation may possibly become complicated. Taking into consideration these points, a method of contacting with a metal salt-containing solution after the solid phase polycondensation step is preferably enumerated. Furthermore, as the metal salt-containing solution, though a liquid capable of dissolving the metal salt therein in an adequate concentration can be used without limitations, an aqueous solution is preferable because its solubility is high and a solvent is easily available. Also, as the contacting method, any method of a batch system or a continuous system can be employed. When the batch system is employed, there can be enumerated a method in which a solution of such a metal salt and the polyethylene terephthalate after completion of the solid phase polycondensation are charged in a processing device and brought into contact with each other. Alternatively, when the continuous system is employed, there can be enumerated a method in which an aqueous solution of such a metal salt is continuously fed countercurrently or concurrently and brought into contact with the polyethylene terephthalate, or a method in which the solution is sprayed onto the polyethylene terephthalate. Moreover, a method in which an aqueous solution of such a metal salt is adhered, followed by drying at an adequate temperature is the most excellent.

Incidentally, since the cyclic trimer content and the acetaldehyde content in the polyethylene terephthalate are usually reduced in the solid phase polycondensation step, it is possible to deal with it by a method of adjusting the intrinsic viscosity IV after the melt polycondensation and before the solid phase polycondensation or the condition of the solid phase polycondensation or the like. Then, according to the manufacturing method of the invention, it is possible to regulate the acetaldehyde content and the cyclic trimer content in the polyethylene terephthalate obtained by the solid phase polycondensation at less than 15 ppm and not more than 0.40% by weight, respectively. The acetaldehyde content is preferably not more than 8 ppm, and more preferably not more than 6 ppm. Also, the cyclic trimer content is preferably not more than 0.38% by weight, and more preferably not more than 0.35% by weight. The "polyethylene terephthalate" as referred to herein includes polyethylene terephthalate immediately after contacting with the foregoing metal salt-containing solution and a polyethylene terephthalate-made molded article obtained by a later injection molding method or other method, too.

(Others)

Thus, the polyethylene terephthalate obtained by the manufacturing method of the invention is excellent in hue and transparency and low in the acetaldehyde content and the Cy-3 content and is useful as a molded article material for bottles or other drink applications. It is preferable that the polyethylene terephthalate is thoroughly dried before manufacturing a molded article, and it is preferable that drying is carried out at a temperature of from 120 to 180° C. in an air atmosphere or an inert gas atmosphere or under circulation of an inert gas.

A test tube-like molded article having an outer diameter of 28 mm, an inner diameter of 19 mm, a length of 136 mm and a weight of 56 g can be obtained by preparing an adequate die and molding the polyethylene terephthalate obtained by the manufacturing method of the invention at a molding temperature of 300° C. Its detailed shape is a generally hollow cylindrical shape, one end of which is closed in a substantially hemispherical shape. It is also possible to regulate the acetaldehyde content and the cyclic trimer content in the test tube-like molded article at less than 13 ppm and not more than 0.40% by weight, respectively. This is the same level as in a molded article of polyethylene terephthalate obtained under an optimum condition by using a conventional germanium compound.

In the light of the above, according to the invention, it is possible to manufacture polyethylene terephthalate by using, as a catalyst, a titanium compound which is cheaper than a germanium compound and which is free from fear in hygiene as compared with an antimony compound or an aluminum compound. The subject polyethylene terephthalate is able to manufacture a molded article having a low acetaldehyde content and a low cyclic trimer content comparable to polyethylene terephthalate resulting from using a germanium compound as a polycondensation catalyst. This fact is greatly meaningful in industry.

EXAMPLES

The invention is described below in more detail with reference to the Examples. Analytic evaluations in the respective Examples and Comparative Examples were made in the following manners.

(1) Intrinsic Viscosity (IV):

0.6 g of a polyethylene terephthalate sample was dissolved under heating in 50 cc of o-chlorophenol and then once cooled, thereby obtaining an o-chlorophenol solution of polyethylene terephthalate. An intrinsic viscosity was calculated from a solution viscosity of the subject solution as measured under a temperature condition of 35° C. by using an Ubbelohde's viscometer.

(2) Terminal Carboxyl Number (CV)

A polyethylene terephthalate sample was pulverized and precisely weighed, and then dissolved in benzyl alcohol, followed by neutralization titration with potassium hydroxide. The titrated value was reduced into a numerical value per unit weight of polyethylene terephthalate, thereby calculating a terminal carboxyl number.

(3) Acetaldehyde (AA) Content:

A polyethylene terephthalate sample was freeze pulverized, charged in a vial and held at 150° C. for 60 minutes. Thereafter, a gas in the vial was analyzed by Hitachi's head space gas chromatography, thereby calculating an AA content.

(4) Analysis of Concentrations of Contained Metal Atom and Phosphorus Atom:

A dried polycondensation catalyst slurry sample was set in a scanning electron microscope (SEM, S570 Model of Hitachi Instruments Service Co., Ltd.). The sample was quantitatively analyzed by an energy dispersive X-ray micro analyzer (XMA, Horiba's EMAX-7000 Model) connected to SEM, thereby calculating a titanium atom concentration and a phosphorus atom concentration in the polycondensation catalyst sample.

With respect to a catalyst metal concentration in polyethylene terephthalate, a granular sample was heat melted on an aluminum plate, from which was then prepared a molded article having a plane by a compression press, and the molded article was quantitatively analyzed by a fluorescent X-ray device (3270E Model of Rigaku Denki Kogyo Co., Ltd.).

(5) Cyclic Trimer (Cy-3) Content:

A polyethylene terephthalate sample was pulverized by a pulverizer, a fixed amount of which was then weighed, and the weighed sample was once cooled with a small amount of a hexafluoroisopropanol/chloroform mixed solution and diluted with chloroform in a fixed concentration (50 g/L). Thereafter, this solution was subjected to gel permeation chromatography (GPC, Waters' ALC/GPC 244 Model), thereby detecting peaks of components appearing in a low molecular weight region. On the other hand, a cyclic trimer (Cy-3) in polyethylene terephthalate was quantitated on the basis of a calibration curve determined from a standard sample of the Cy-3.

(6) Polymerization Degree of Oligomer:

A sample of an esterification reaction product obtained by the esterification step was sampled, and the amount of a carboxyl terminal group was measured by a method of Maurice, et al. [*Anal. Chim. Acta,* 22, page 363 (1960)]. Next, the sample of the esterification reaction product was dissolved in hexafluoroisopropanol, and this solution was quantitated for the amount of a hydroxyl terminal group by using $^{13}$C-NMR. Furthermore, a number average molecular weight was determined from the both amounts of a hydroxyl terminal group and reduced into a polymerization degree.

(7) Analysis of Alkali Metal Atom Content in Polyethylene Terephthalate:

A polyethylene terephthalate sample was formed into a 1% by weight o-chloroform solution, to which was then added a twice amount of a 0.5% by mole hydrochloric acid aqueous solution, followed by shaking and extraction. A solution of the resulting aqueous phase was analyzed and quantitated by a Z-2300 Model atomic absorption photometer of Hitachi High-Technologies Corporation.

Referential Example 1

In a catalyst preparation tank equipped with a stirrer, a nitrogen circulation conduit and a heating unit, 21 parts by weight of ethylene glycol was charged, to which were then gradually added 0.023 parts by weight of acetic acid and 0.162 parts by weight of titanium tetrabutoxide while mixing and stirring. The catalyst preparation tank was held at 50° C. for 2 hours to obtain a transparent ethylene glycol solution of a titanium compound. This solution is hereinafter referred to as "TBT/EG solution". As a result of measuring a titanium concentration in this TBT/EG solution by using a fluorescent X-ray, the titanium content was found to be 1.0% by weight.

Furthermore, in a separate catalyst preparation tank equipped with a stirrer, a nitrogen circulation conduit and a heating unit, 17.57 parts by weight of ethylene glycol was charged and heated to 120° C. while stirring, to which was added 0.147 parts by weight of mono-n-butylphosphate. The contents were mixed for dissolution under heating while stirring. In the subject catalyst preparation tank, the whole of the previously prepared TBT/EG solution was gradually added. Thereafter, the mixture was stirred and kept at a temperature of 120° C. for one hour, thereby completing a reaction between the titanium compound and the phosphorus compound. The subject reaction product was present as a fine deposit in a cloudy state. This solution is hereinafter referred to as "TBMBP catalyst solution". From a part of this solution, the fine deposit in the solution was separated and purified, and as a result of various analyses, it was confirmed that this fine deposit is a compound represented by the general formula (I) and a compound wherein $R_1$ is an n-butyl group.

Example 1

In a complete mixing reactor where 450 parts by mass in average per unit hour of an ethylene terephthalate oligomer retained, a slurry prepared by mixing 358 parts by mass per unit hour of high-purity terephthalic acid and 190 parts by mass per unit hour of ethylene glycol was continuously fed with stirring in a nitrogen atmosphere under a condition kept at 274.5° C. under atmospheric pressure. An esterification reaction was completed for a theoretical residence time within the reactor of 4 hours while distilling off water generated in the esterification reaction and ethylene glycol outside the reactor. At this time, a rate of esterification calculated from the amount of water generated in the esterification reaction was 98% or more, and a degree of polymerization of the formed ethylene terephthalate oligomer was from about 5 to 9.

450 parts by mass of the ethylene terephthalate oligomer obtained in this esterification reaction was successively transferred into a polycondensation reaction tank, and 4 parts by mass per unit hour of the TBMBP catalyst solution as prepared in Referential Example 1 was charged as a polycondensation catalyst thereinto. A polycondensation reaction was carried out in a molten state while keeping the reaction temperature and the reaction pressure within the polycondensation reaction tank at 276.5° C. and 60 Pa, respectively and removing water generated in the polycondensation reaction and ethylene glycol outside the polycondensation reaction tank. At this time, a residence time within the polycondensation reaction tank was 180 minutes. Thereafter, the reaction product within the polycondensation reaction tank was continuously extruded in a strand state from a discharge section, cooled with water and then cut to obtain granular polyethylene terephthalate having a size of about 3 mm. This polyethylene terephthalate (melt polycondensed polyethylene terephthalate) had an IV of 0.492 dL/g and a terminal carboxyl number of 17 mmol/kg.

This melt polycondensed polyethylene terephthalate was crystallized under circulation of nitrogen at 160° C. for 5 hours and dried. Subsequently, the crystallized polyethylene terephthalate was charged in a tumbler type solid phase polycondensation device and subjected to a solid phase polycondensation reaction under a reduced pressure of 0.13 kPa at 225° C. for 27 hours. By using this polyethylene terephthalate after completion of the solid phase polycondensation (solid phase polycondensed polyethylene terephthalate), a preform molded article was molded in the following method.

5 kg of the polyethylene terephthalate was dried by using a plate type dryer for 5 hours or more under a condition at a temperature of 160° C. under atmospheric pressure in a nitrogen stream. The dried polyethylene terephthalate was injection molded into a cylindrical test tube-like molded article having an outer diameter of 28 mm, an inner diameter of 19 mm, a length of 136 mm and a weight of 56 g by an injection molding machine (FN-2000 Model, manufactured by Nissei Plastic Industrial Co., Ltd.) at a cylinder temperature of 300° C. and at screw revolution number of 160 rpm for a primary pressure time of 3.0 seconds at a die temperature of 10° C. for a cycle of 30 seconds. In view of the matter that a bottle is obtainable by blow molding this test tube-like molded article, this test tube-like molded article is referred to as "molded preform".

An intrinsic viscosity, a terminal carboxyl number, a Ti atom content, a P atom content, a K atom content and other material properties of each of a series of polyethylene terephthalates (melt polycondensed polyethylene terephthalate and solid phase polycondensed polyethylene terephthalate) and molded preform are shown in Tables 1 and 2.

Example 2

A polycondensation reaction was carried out in the same manner as in Example 1, except that in Example 1, the esterification reaction temperature was changed to 273.5° C., thereby obtaining melt polycondensed polyethylene terephthalate having an IV of 0.489 dL/g and a terminal carboxyl number of 19 mmol/kg. Material properties of each of the resulting melt polycondensed polyethylene terephthalate, solid phase polycondensed polyethylene terephthalate and molded preform are shown in Tables 1 and 2.

Example 3

A polycondensation reaction was carried out in the same manner as in Example 1, except that in Example 1, the esterification reaction temperature was changed to 273.0° C., thereby obtaining melt polycondensed polyethylene terephthalate having an IV of 0.483 dL/g and a terminal carboxyl number of 22 mmol/kg. Material properties of each of the resulting melt polycondensed polyethylene terephthalate, solid phase polycondensed polyethylene terephthalate and molded preform are shown in Tables 1 and 2.

Example 4

A polycondensation reaction was carried out in the same manner as in Example 1, except that in Example 1, the esterification reaction temperature was changed to 273.5° C. and that the melt polycondensation temperature was changed to 277.5° C., thereby obtaining melt polycondensed polyethylene terephthalate having an IV of 0.520 dL/g and a terminal carboxyl number of 18 mmol/kg. Material properties of each of the resulting melt polycondensed polyethylene terephthalate, solid phase polycondensed polyethylene terephthalate and molded preform are shown in Tables 1 and 2.

Comparative Example 1

A polycondensation reaction was carried out in the same manner as in Example 1, except that in Example 1, the esterification reaction temperature was changed to 272.0° C., thereby obtaining melt polycondensed polyethylene terephthalate having an IV of 0.491 dL/g and a terminal carboxyl number of 26 mmol/kg. Material properties of each of the resulting melt polycondensed polyethylene terephthalate, solid phase polycondensed polyethylene terephthalate and molded preform are shown in Tables 1 and 2.

Comparative Example 2

A polycondensation reaction was carried out in the same manner as in Example 1, except that in Example 1, the esterification reaction temperature was changed to 273.5° C. and that the melt polycondensation temperature was changed to 278.3° C., thereby obtaining melt polycondensed polyethylene terephthalate having an IV of 0.544 dL/g and a terminal carboxyl number of 17 mmol/kg. Material properties of each of the resulting melt polycondensed polyethylene terephthalate, solid phase polycondensed polyethylene terephthalate and molded preform are shown in Tables 1 and 2.

Example 5

In a complete mixing reactor where 450 parts by mass in average per unit hour of an ethylene terephthalate oligomer retained, a slurry prepared by mixing 358 parts by mass per unit hour of high-purity terephthalic acid and 190 parts by mass per unit hour of ethylene glycol was continuously fed with stirring in a nitrogen atmosphere under a condition kept at 274.5° C. under atmospheric pressure. An esterification reaction was completed for a theoretical residence time within the reactor of 4 hours while distilling off water generated in the esterification reaction and ethylene glycol outside the reactor. At this time, a rate of esterification calculated in the same manner as in Example 1 was 98% or more, and a degree of polymerization of the formed ethylene terephthalate oligomer was from about 5 to 9.

450 parts by mass of the ethylene terephthalate oligomer obtained in this esterification reaction was successively transferred into a polycondensation reaction tank, and 4 parts by mass per unit hour of the TBMBP catalyst solution as prepared in Referential Example 1 was charged as a polycondensation catalyst thereinto. A polycondensation reaction was carried out in a molten state while keeping the reaction temperature and the reaction pressure within the polycondensation reaction tank at 276.5° C. and 60 Pa, respectively and removing water generated in the polycondensation reaction and ethylene glycol outside the polycondensation reaction tank. At this time, a residence time within the polycondensation reaction tank was 180 minutes. Thereafter, the reaction product within the polycondensation reaction tank was continuously extruded in a strand state from a discharge section, cooled with water and then cut to obtain granular polyethylene terephthalate having a size of about 3 mm. This melt polycondensed polyethylene terephthalate had an IV of 0.492 dL/g and a terminal carboxyl number of 17 mmol/kg.

This melt polycondensed polyethylene terephthalate was crystallized under circulation of nitrogen at 160° C. for 5 hours and dried. Subsequently, the crystallized polyethylene terephthalate was charged in a tumbler type solid phase polycondensation device and subjected to a solid phase polycondensation reaction under a reduced pressure of 0.13 kPa at 225° C. for 27 hours. A potassium acetate aqueous solution was added in the resulting polyethylene terephthalate by spraying such that a potassium atom content in the polyethylene terephthalate was 8 ppm. Thereafter, drying was carried out to obtain solid phase polycondensed polyethylene terephthalate. Thereafter, a preform molded article was molded in the same manner as in Example 1.

An intrinsic viscosity, a terminal carboxyl number, a Ti atom content, a P atom content, a K atom content and other material properties of each of a series of melt polycondensed polyethylene terephthalate and solid phase polycondensed polyethylene terephthalate and molded preform are shown in Tables 1 and 2.

Example 6

A polycondensation reaction was carried out in the same manner as in Example 5, except that in Example 5, the esterification reaction temperature was changed to 273.5° C., thereby obtaining melt polycondensed polyethylene terephthalate having an IV of 0.489 dL/g and a terminal carboxyl number of 19 mmol/kg. Material properties of each of the resulting melt polycondensed polyethylene terephthalate, solid phase polycondensed polyethylene terephthalate and molded preform are shown in Tables 1 and 2.

Example 7

A polycondensation reaction was carried out in the same manner as in Example 5, except that in Example 5, the esterification reaction temperature was changed to 273.0° C., thereby obtaining melt polycondensed polyethylene terephthalate having an IV of 0.483 dL/g and a terminal carboxyl number of 22 mmol/kg. Material properties of each of the resulting melt polycondensed polyethylene terephthalate, solid phase polycondensed polyethylene terephthalate and molded preform are shown in Tables 1 and 2.

Example 8

A polycondensation reaction was carried out in the same manner as in Example 5, except that in Example 5, the esterification reaction temperature was changed to 274.9° C., thereby obtaining melt polycondensed polyethylene terephthalate having an IV of 0.494 dL/g and a terminal carboxyl number of 15 mmol/kg. Material properties of each of the resulting melt polycondensed polyethylene terephthalate, solid phase polycondensed polyethylene terephthalate and molded preform are shown in Tables 1 and 2.

Example 9

A polycondensation reaction was carried out in the same manner as in Example 5, except that in Example 5, the esterification reaction temperature was changed to 273.5° C. and that the melt polycondensation temperature was changed to 277.5° C., thereby obtaining melt polycondensed polyethylene terephthalate having an IV of 0.520 dL/g and a terminal carboxyl number of 18 mmol/kg. Material properties of each of the resulting melt polycondensed polyethylene terephthalate, solid phase polycondensed polyethylene terephthalate and molded preform are shown in Tables 1 and 2.

Examples 10 and 11

In Example 9, the amount of spraying of the potassium acetate aqueous solution was changed so as to have a value of the potassium atom content in the polyethylene terephthalate as shown in Table 2, and thereafter, drying was carried out to obtain solid phase polycondensed polyethylene terephthalates. Material properties of each of the resulting melt polycondensed polyethylene terephthalates, solid phase polycondensed polyethylene terephthalates and molded preforms are shown in Tables 1 and 2.

Examples 12 and 13

In Example 9, a sodium acetate aqueous solution or a cesium acetate aqueous solution was used instead of using the potassium acetate aqueous solution, the amount of spraying was changed so as to have a value of the alkali atom content in the polyethylene terephthalate as shown in Table 2, and thereafter, drying was carried out to obtain solid phase polycondensed polyethylene terephthalates. Material properties of each of the resulting melt polycondensed polyethylene terephthalates, solid phase polycondensed polyethylene terephthalates and molded preforms are shown in Tables 1 and 2.

Comparative Example 3

A polycondensation reaction was carried out in the same manner as in Example 1, except that in Example 1, the conditions were changed as follows. The esterification reaction temperature was changed from 274.5° C. to 277.2° C.; and instead of charging 4 parts by mass per unit hour of the TBMBP catalyst solution as the polycondensation catalyst, 6.8 parts by mass per unit hour of a 1% by mass germanium dioxide/ethylene glycol solution and 1 part by mass per unit hour of an ethylene glycol solution of phosphoric acid (5.5% by mass in terms of a phosphorus concentration) were charged. Furthermore, the melt polycondensation temperature was changed from 276.5° C. to 277.7° C., thereby obtaining melt polycondensed polyethylene terephthalate having an IV of 0.510 dL/g and a terminal carboxyl number of 26 mmol/kg. Finally, the solid phase polycondensation was carried out at 220° C. for 23 hours instead of carrying out it at 225° C. for 27 hours. Material properties of each of the resulting melt polycondensed polyethylene terephthalate, solid phase polycondensed polyethylene terephthalate and molded preform are shown in Tables 1 and 2.

TABLE 1

|  | Kind of catalyst | Melt polycondensed polyethylene terephthalate | | Solid phase polycondensed polyethylene terephthalate | |
|---|---|---|---|---|---|
|  |  | IV (dL/g) | CV (mmol/kg) | IV (dL/g) | CV (mmol/kg) |
| Example 1 | TBMBP | 0.492 | 17 | 0.752 | — |
| Example 2 | TBMBP | 0.489 | 19 | 0.754 | — |
| Example 3 | TBMBP | 0.483 | 22 | 0.762 | — |
| Example 4 | TBMBP | 0.520 | 18 | 0.769 | — |
| Example 5 | TBMBP | 0.492 | 17 | 0.752 | 9.7 |
| Example 6 | TBMBP | 0.489 | 19 | 0.754 | 10.4 |
| Example 7 | TBMBP | 0.483 | 22 | 0.762 | 9.7 |
| Example 8 | TBMBP | 0.494 | 15 | 0.751 | 9.5 |
| Example 9 | TBMBP | 0.520 | 18 | 0.769 | 8.2 |
| Example 10 | TBMBP | 0.520 | 18 | 0.774 | 8.1 |
| Example 11 | TBMBP | 0.520 | 18 | 0.770 | 8.4 |
| Example 12 | TBMBP | 0.520 | 19 | 0.774 | 8.2 |
| Example 13 | TBMBP | 0.520 | 18 | 0.772 | 8.4 |
| Comparative Example 1 | TBMBP | 0.491 | 26 | 0.762 | — |
| Comparative Example 2 | TBMBP | 0.544 | 17 | 0.740 | — |
| Comparative Example 3 | $GeO_2$ | 0.510 | 26 | 0.747 | 15.0 |

TABLE 2

|  | Solid phase polycondensed polyethylene terephthalate | | Alkali metal (Kind) | Molded preform | | |
|---|---|---|---|---|---|---|
|  | Ti (ppm) | P (ppm) | Content (ppm) | IV (dL/g) | AA (ppm) | Cy-3 (wt %) |
| Example 1 | 9 | 13 | 0 (K) | 0.658 | 10.4 | 0.31 |
| Example 2 | 10 | 15 | 0 (K) | 0.661 | 12.7 | 0.33 |
| Example 3 | 8 | 14 | 0 (K) | 0.670 | 12.1 | 0.37 |
| Example 4 | 9 | 12 | 0 (K) | 0.691 | 10.9 | 0.35 |
| Example 5 | 9 | 13 | 8 (K) | 0.659 | 6.1 | 0.33 |
| Example 6 | 10 | 15 | 8 (K) | 0.665 | 6.5 | 0.29 |
| Example 7 | 8 | 14 | 8 (K) | 0.673 | 4.6 | 0.37 |
| Example 8 | 9 | 14 | 8 (K) | 0.657 | 5.8 | 0.26 |
| Example 9 | 9 | 12 | 8 (K) | 0.691 | 5.4 | 0.35 |
| Example 10 | 9 | 13 | 5.5 (K) | 0.698 | 7.1 | 0.36 |
| Example 11 | 9 | 13 | 2.5 (K) | 0.694 | 9.2 | 0.37 |
| Example 12 | 9 | 13 | 9 (Na) | 0.666 | 8.5 | 0.36 |
| Example 13 | 9 | 13 | 9 (Cs) | 0.668 | 7.3 | 0.34 |
| Comparative Example 1 | 10 | 14 | 0 | 0.680 | 12.2 | 0.41 |
| Comparative Example 2 | 9 | 15 | 0 | 0.663 | 17.5 | 0.61 |
| Comparative Example 3 | 0* | 20 | 0 | 0.689 | 9.7 | 0.39 |

*Though the Ti atom content was 0 ppm, the Ge atom content was 55 ppm.

The invention claimed is:

1. A manufacturing method of polyethylene terephthalate including a step of carrying out melt polycondensation by using a compound represented by the following general formula (I) as a polycondensation catalyst to obtain melt polycondensed polyethylene terephthalate having an intrinsic viscosity of from 0.48 to 0.53 dL/g and a terminal carboxyl number of from 14 to 22 mmol/kg; and a step of further solid phase polycondensing the melt polycondensed polyethylene terephthalate to obtain solid phase polycondensed polyethylene terephthalate having an intrinsic viscosity of from 0.70 to 0.86 dL/g:

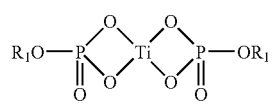

(I)

wherein $R_1$ represents an alkyl group having from 2 to 12 carbon atoms, and wherein the solid phase polycondensed polyethylene terephthalate has a terminal carboxyl number of less than 15 mmol/kg followed by a step of applying an aqueous solution of at least one salt selected from the group consisting of acetate, carbonate, and sulfate of sodium, potassium, or cesium to the solid phase polycondensed polyethylene terephthalate, and then drying the solid phase polycondensed polyethylene terephthalate, wherein the final content of sodium, potassium or cesium atom in dried polyethylene terephthalate is from 2 to 25 ppm, and from 2 to 25 ppm of at least one atom selected from the group consisting of sodium, potassium and cesium is contained in the solid phase polycondensed polyethylene terephthalate.

2. The manufacturing method of polyethylene terephthalate according to claim 1, wherein a titanium atom content in the solid phase polycondensed polyethylene terephthalate is from 1 to 50 ppm.

3. The manufacturing method of polyethylene terephthalate according to claim 1, wherein the step of melt polycondensation includes an esterification reaction step, and a conversion degree in the esterification reaction step is 90% or more.

4. The manufacturing method of polyethylene terephthalate according to claim 1, wherein the step of melt polycondensation includes an esterification reaction step, and a final esterification reaction temperature in the esterification reaction step is from 250 to 279° C.

5. The manufacturing method of polyethylene terephthalate according to claim 1, wherein the step of melt polycondensation includes an esterification reaction step, and a degree of polymerization of an ethylene terephthalate oligomer obtained in the esterification reaction step is from 3 to 12.

6. The manufacturing method of polyethylene terephthalate according to claim 1, wherein the step of melt polycondensation includes an esterification reaction step using ethylene glycol and terephthalic acid as starting materials, and an ethylene glycol/terephthalic acid molar ratio used in the esterification reaction step is from 1.2 to 1.8.

7. The manufacturing method of polyethylene terephthalate according to claim 1, wherein a titanium atom content in the solid phase polycondensed polyethylene terephthalate is from 5 to 25 ppm.

8. The manufacturing method of polyethylene terephthalate according to claim 1, wherein the melt polycondensed polyethylene terephthalate having an intrinsic viscosity of from 0.48 to 0.53 dL/g and a terminal carboxyl number of from 14 to 22 mmol/kg is obtained by a liquid phase polycondensation step.

9. The manufacturing method of polyethylene terephthalate according to claim 8, wherein the liquid phase polycondensation step is carried out in a single tank.

10. The manufacturing method of polyethylene terephthalate according to claim 8, wherein the liquid phase polycondensation step is carried out in plural tanks.

11. The manufacturing method of polyethylene terephthalate according to claim 10, wherein the liquid phase polycondensation step is carried out in two stages, wherein the polycondensation reaction in a first tank is carried out under a condition that the reaction temperature is from 245 to 290° C. and that the reaction pressure is from 100 to 1 kPa, and the polycondensation reaction in a final second tank is carried out under a condition that the reaction temperature is from 265 to 300° C. and that the reaction pressure is from 1,000 to 10 Pa.

12. The manufacturing method of polyethylene terephthalate according to claim 1, wherein the polyethylene terephthalate obtained by the solid phase polycondensation has an acetaldehyde content of not more than 8 ppm.

13. The manufacturing method of polyethylene terephthalate according to claim 1, wherein the polyethylene terephthalate obtained by the solid phase polycondensation has a cyclic trimer content not more than 0.40% by weight.

* * * * *